(12) United States Patent
Kaltenbacher et al.

(10) Patent No.: US 7,417,666 B2
(45) Date of Patent: Aug. 26, 2008

(54) 3-D IMAGING SYSTEM

(75) Inventors: Eric A. Kaltenbacher, St. Petersburg, FL (US); James T. Patten, Sarasota, FL (US); Kendall L. Carder, St. Petersburg, FL (US); David K. Costello, St. Petersburg, FL (US); John R. Kloske, St. Petersburg, FL (US)

(73) Assignee: University of South Florida, Tampa, FL (US)

( * ) Notice: Subject to any disclaimer, the term of this patent is extended or adjusted under 35 U.S.C. 154(b) by 609 days.

(21) Appl. No.: 10/815,489

(22) Filed: Apr. 1, 2004

(65) Prior Publication Data

US 2005/0007448 A1    Jan. 13, 2005

Related U.S. Application Data

(60) Provisional application No. 60/320,076, filed on Apr. 1, 2003, provisional application No. 60/545,158, filed on Feb. 17, 2004.

(51) Int. Cl.
*H04N 7/18* (2006.01)
(52) U.S. Cl. .......................... 348/81; 348/148
(58) Field of Classification Search ............. 348/36–61, 348/50–175
See application file for complete search history.

(56) References Cited

U.S. PATENT DOCUMENTS

| | | | |
|---|---|---|---|
| 4,143,400 A * | 3/1979 | Heckman et al. ............ 348/31 |
| 4,277,167 A * | 7/1981 | Eppel ...................... 356/5.02 |
| 4,855,961 A | 8/1989 | Jaffe et al. |
| 5,155,706 A | 10/1992 | Haley et al. |
| 5,231,609 A | 7/1993 | Gaer |
| 5,257,085 A * | 10/1993 | Ulich et al. ................. 356/73 |
| 5,321,667 A | 6/1994 | Audi et al. |
| 5,418,608 A * | 5/1995 | Caimi et al. .............. 356/3.01 |
| 5,467,122 A * | 11/1995 | Bowker et al. ............... 348/31 |
| 5,543,910 A | 8/1996 | Wallin |
| 5,612,928 A | 3/1997 | Haley et al. |
| 5,687,137 A | 11/1997 | Schmidt et al. |
| 5,784,162 A * | 7/1998 | Cabib et al. ................. 356/456 |
| 5,894,450 A | 4/1999 | Schmidt et al. |
| 5,929,453 A | 7/1999 | Andrews et al. |
| 5,947,051 A | 9/1999 | Geiger |
| 5,995,882 A | 11/1999 | Patterson et al. |
| 6,319,079 B1 | 11/2001 | Cooper |

* cited by examiner

*Primary Examiner*—Anand Rao
(74) *Attorney, Agent, or Firm*—Ronald E. Smith; Smith & Hopen, P.A.

(57) ABSTRACT

The invention is directed to a remote 3-D imaging system which uses a novel illumination source to establish the relationship of the image features to the system, which is displayed by virtue of calculations. In addition to static surfaces, moving surfaces may be studied and corrections due to turbidity and platform position are also easily compensated for. The instant system may also contain a plurality of sensing systems based on light, including traditional reflective or elastic scattering and novel fluorescent or non-elastic scattering still and video imaging systems, including time-gated systems.

46 Claims, 5 Drawing Sheets

3-D IMAGING SYSTEM

CLAIM TO PRIORITY

This applications claims priority to U.S. Provisional Application Ser. No. 60/320,076 filed on Apr. 1, 2003, and U.S. Provisional Patent Application Ser. No. 60/545,158 filed Feb. 17, 2004.

STATEMENT OF GOVERNMENT INTEREST

The work that led to this invention has been supported in part by a grant from the Office of Naval Research, Grant Number N00014-01-1-0279. Thus, the United States Government may have certain rights to this invention.

FIELD OF THE INVENTION

This invention relates to the field of imaging techniques and the in situ evaluation of the properties of surfaces or features of interest. More particularly, the instant invention relates to a system for inspecting the surface characteristics of a vessel or the ocean floor using a tethered or autonomous vessel designed to accurately image the surface under inspection to locate abnormalities or features of interest.

BACKGROUND OF THE INVENTION

Interest in the profile of underwater surfaces has grown significantly in the past several decades. Indeed, the ability to map and detect features in the underwater environment has become of interest in the areas of science, resource exploration, and national defense, to name a few. This has led to the development of various types of instrumentation for imaging the areas of interest.

One type of imaging system employs the use of sonar technology and translates the differences in the echo signal to locate abnormalities in a body of water. U.S. Pat. No. 5,321,667 to Audi et al represents such a system. These systems are adapted to generate information over a large scan area, but are limited in degrees of resolution, which dictates accuracy of the information, based on the ping rates and distance to the object.

A multi-platform system for acoustic surveillance is disclosed in Gaer, U.S. Pat. No. 5,231,609. In Gaer, a plurality of acoustic platforms aid in providing an accurate sonic image or shadow. Because of the use of more than one signal to produce the image, Gaer is able to track a moving object. This system, however, requires a highly sophisticated interfacing of the actual signals and signal generators to provide the sought information, thus making it a very expensive system and one that, by virtue of the amount of variables to be controlled, may be difficult to keep in synchronization.

Another system, which employs a plurality of platforms, is disclosed in Schmidt et al, U.S. Pat. No. 5,894,450. This multi-AUV system is able to obtain a profile of data by virtue of collecting the single data sets obtained by the AUVs and collating the same. This again may be a highly expensive and complicated system to use.

Another imaging system is described in Haley et al, U.S. Pat. No. 5,155,706. In Haley et al. the data obtained from different passes over the image are manipulated according to an algorithm to produce a clearer image of the desired object or feature. This system, although being lower in cost and easier to use than the multi-platform systems, admittedly produces notable false readings.

An additional patent to Haley et al, U.S. Pat. No. 5,612,928, also describes a pixel classifying system, but again this system is incapable of producing 3-D images of photo quality, but instead produces images that resemble computer renderings.

Jaffe et al, U.S. Pat. No. 4,855,961, describes another sonar imaging system employing a plurality of transmitters in conjunction with a plurality of receivers to assist in establishing a 3-D image of the object. This system, since it uses sonar for imaging, is limited in the degree of resolution available.

Another method of determining the size of an object by virtue of measurements at known spaces apart is taught by Wallin in U.S. Pat. No. 5,543,910. In Wallin, the size of an object is calculated based on a geometric model with two signals being sent from two different periscopes and at two differing angles with respect to the host devices to determine the actual distance via the geometric model from the feedback. The Wallin system is capable of location and is not a per se imaging system.

Cooper, U.S. Pat. No. 6,319,079, discloses a system with a video camera that sends back images from the underwater site. This device is also limited in that it requires a diver to operate the equipment.

Geiger, U.S. Pat. No. 5,947,051 also describes a system with a camera attached to it and discusses 3-D images. Geiger uses a system with a lidar x-y raster scanning laser beam instead of a video type of camera to obtain images. Because of the raster feature, this differs from a single fixed source. In addition, a TV camera is also disclosed as an alternate embodiment, but there is no discussion of the turbidity problems that underwater optical imaging can experience.

Patterson et al, U.S. Pat. No. 5,995,882, also describes a system with a video camera. No disclosure is made on how the images are enhanced or obtained in sufficient clarity to produce accurate representations of the object under investigation.

The use of fluorescence to detect organic materials is taught in Andrews, U.S. Pat. No. 5,929,453. In Andrews a spectrometer type of instrument is used to detect trace organics for oil spill determination but the system is not part of a moving or scanning type of device.

Finally, Schmidt et al, U.S. Pat. No. 5,687,137, describes a combination wide-scale and smaller scale measurement system which can be programmed to respond to a signal instructing it to return to an area of interest and activate finer measurements via tomography. This system, although it is sonic in design, is capable of both broad scanning and finer types of scans. No imaging specifics are addressed in this patent.

SUMMARY OF THE INVENTION

The present invention provides for a 3-D imaging system and method of obtaining 3-D images adapted for remote information acquisition. An embodiment of the present invention comprises a platform for supporting and conveying the imaging system, an illumination source affixed to the platform which transmits light to an object being scanned a light detector affixed to the platform adapted to collect light reflected back from the object being scanned and a data processing system in communication with the light detector for compiling data obtained from the reflected light to produce an image therefrom.

The present invention further provides for detecting the change in wavelength associated with light received from the object being scanned. The illumination source for use with the present invention can be any light emitting device. It, however, is preferred in this invention to use a laser, and more preferably to use a laser with a planar geometry. The laser used by this invention can have a wavelength in the range of 400 to 630 nm, preferably in the range of 450 to 600 nm, and most preferably in the range of 500 to 575 nm.

The present invention can analyze and scan a variety of objects. For example, the present invention can analyze and scan sea floor, objects resting on the sea floor, tethered objects, ship's hulls, seawalls, and floating objects.

The present invention can be used with a navigational sensor system in order to facilitate locating an object being scanned.

Still additional objects or embodiments will become apparent as the invention is further described.

DETAILED DESCRIPTION OF THE PREFERRED EMBODIMENTS

The present invention provides for a 3-D imaging system and method of obtaining 3-D images adapted for remote information acquisition. An embodiment of the present invention comprises a platform for supporting and conveying the imaging system, an illumination source affixed to the platform which transmits light to an object being scanned a light detector affixed to the platform adapted to collect light reflected back from the object being scanned and a data processing system in communication with the light detector for compiling data obtained from the reflected light to produce an image therefrom.

The present invention further provides for detecting the change in wavelength associated with light received from the object being scanned. The illumination source for use with the present invention can be any light emitting device. It, however, is preferred in this invention to use a laser, and more preferably to use a laser with a planar geometry. The laser used by this invention can have a wavelength in the range of 400 to 630 nm, preferably in the range of 450 to 600 nm, and most preferably in the range of 500 to 575 nm.

The present invention can analyze and scan a variety of objects. For example, the present invention can analyze and scan sea floor, objects resting on the sea floor, tethered objects, ship's hulls, seawalls, and floating objects. The data processing system compiles the data obtained from the reflected light which can be stored for later use or transmitted to a remote location in real time for projection of the image on a display.

The present invention can be used with a navigational sensor system in order to facilitate locating an object being scanned.

Figure 1:
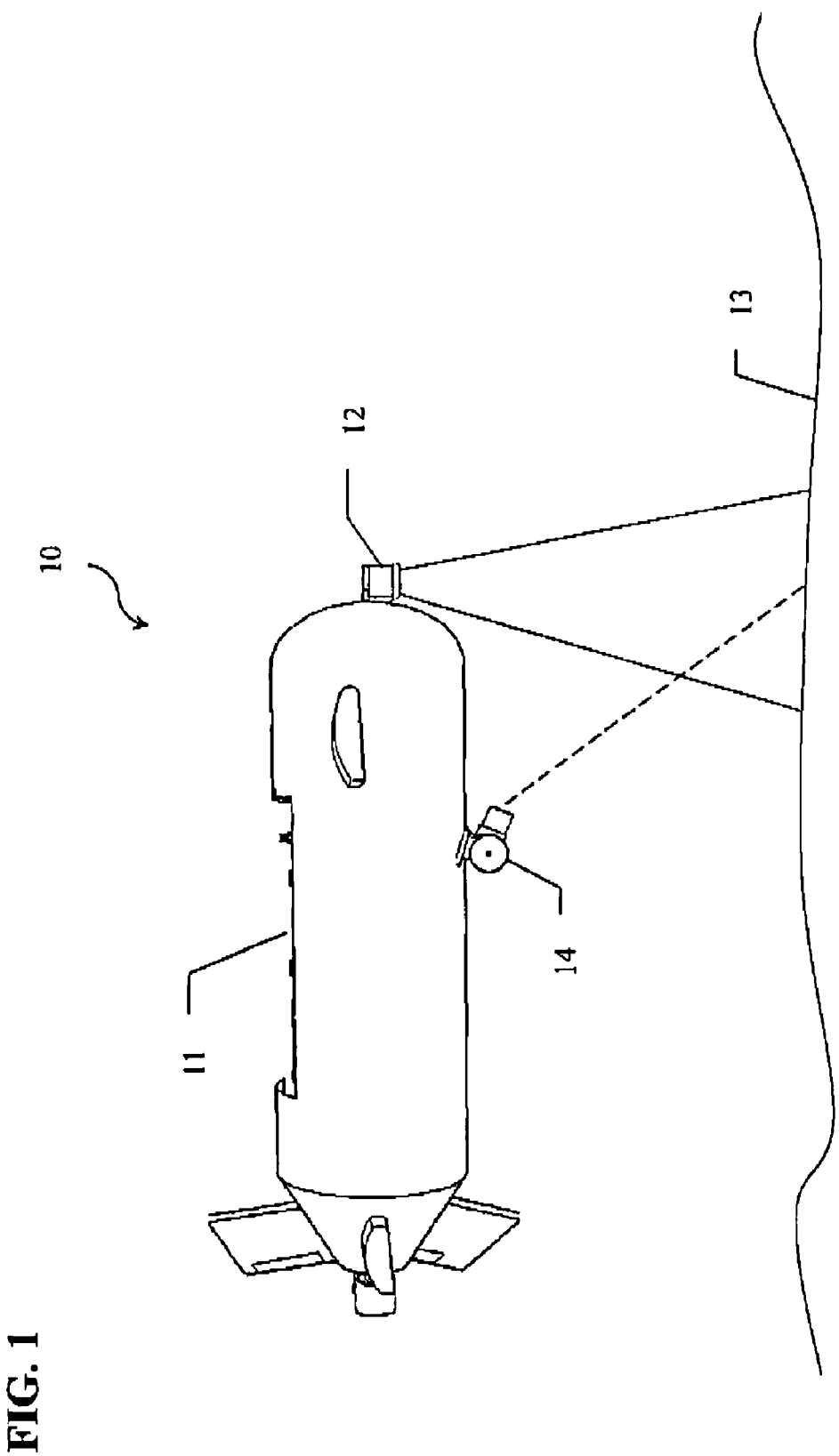
FIG. 1 is an elevation schematic of an embodiment of an imaging system of the instant invention.

Referring now to FIG. 1, the instant system 10 includes a platform 11 which contains an illumination source 12 which is directed a object 13, which is in turn recorded by virtue of a light detector 14.

The platform 11 may be of any design for conveying the imaging apparatus, these including AUVs, ROVs, and other underwater conveying means. In addition, boats or ships may be outfitted with the apparatus of the instant invention. The imaging may occur below, above, on the surface of a body of water or as a side-scanning function with respect to the horizontal axis of the platform. In addition, if aerial observation is intended as the use, any form of manned or unmanned vehicle may be used as the supporting and impelling means. Also contemplated is the use of stationary underwater platforms geared to image ships or other water vessels as they pass over it. For the purposes of the preferred embodiments of this application, however, ROVs or AUVs are the preferred platforms.

The illumination source 12 may also be any suitable illumination means known to one of ordinary skill in the art, but for the purposes of the preferred embodiment, is a laser source. This source may be selected as a narrow wavelength source as desired for the fluorescence embodiment of the instant invention, or may be of a broader range of wavelengths for more general illumination. In addition, a single source may be used or a plurality or sources, including use of a multiplicity of different types of illumination devices as known to those of ordinary skill in the art. The source or sources are preferably movably mounted to provide flexibility in changing the source to detector separation as desired. It is considered preferable to use a very high intensity laser source so that a high degree of illumination is achieved from this source. In addition, various filter mechanisms may be used in combination with the light source to screen out or isolate certain wavelengths. It is preferred that the source should have a narrow field of view in the along-track direction such as provided by a spot or cross-track-dispersed fan beam.

Object 13 may be any object desired for inspection. Some of these include, but are not limited to, sea floor, ship's hulls, seawalls, and objects resting on the sea floor or tethered to it and floating objects. It is understood for the purposes of this application that the term "sea" encompasses any body of water, fresh or salt in nature and of any size. In the case of ship's hulls, the instant invention is arranged so that the illumination is directed to a side-facing surface or even an upwardly facing surface, such as the actual bottom of a ship. In addition, in the above in-water embodiments, the apparatus may be used to image tops, sides, or bottoms of objects of interest.

The light detector 14 may comprise any type of known device to those of ordinary skill in the art such as still cameras, video cameras, computer digitization, and graphic representations. In addition, it is contemplated that a plurality of these means may be used jointly either solely or in combination to provide information storage and display means. The recording or detection device is preferably also movably mounted to allow for adjustments in the source-to-detector-separation and the viewing angle of the detector as desired. Both real time imaging and data storage are the recording or detection device of choice in certain preferred embodiments. In addition, any known camera enhancement systems may be employed, these including filters and focusing means—such systems are readily known and available to one of ordinary skill in the art.

Figure 2:
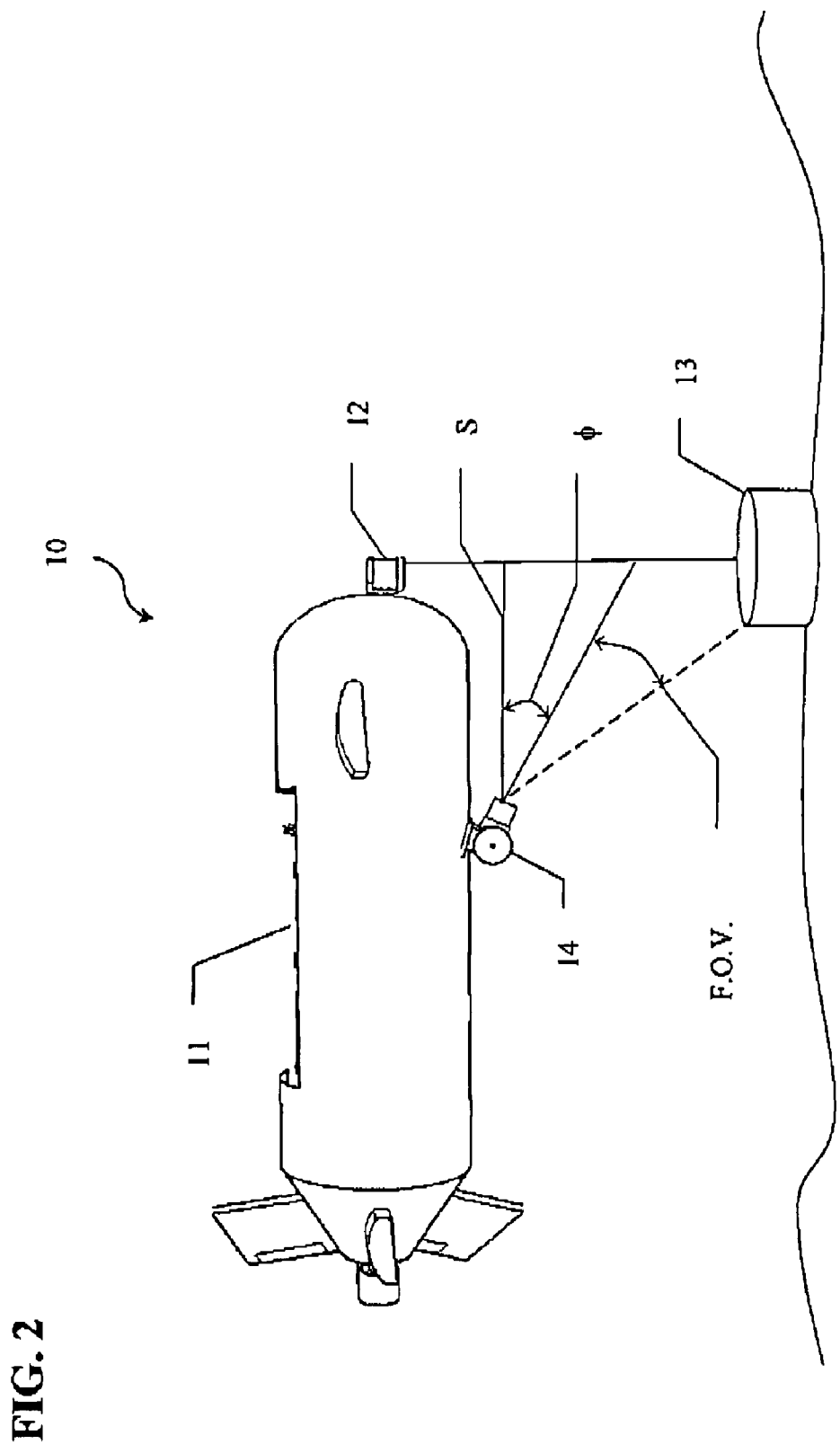
FIG. 2 is a more detailed showing of the imaging portion with respect to the algorithm values used for results calculation of the instant invention.

FIG. 2 is a more detailed representation of the imaging system of the instant invention. In this embodiment, the illumination source 12 is directed downward toward the object 13 with the detector 14. By virtue of their fixed relationship to one another, the height and geometric features of the object 13 can be represented both visually by the camera and digitally by virtue of the digital image generated by the calculations made by the equation:

$$R = S \bullet \tan\left(\phi + \frac{row\ \# \bullet F.O.V.}{totalrows}\right)$$

where:
totalrows=total # of vertical imaging elements or pixels
row#=current row where line is detected
R=the distance between the source and the object being scanned
S=the distance between the source and the detector
F.O.V.=the field of view as seen by the detector in relation to the object
φ=the vertical angle between the illumination beam and the center of the field of view of the camera Because the illumination source 12 and recorder or detector 14 are separated and not coaxial, backscatter effects from the illumination source due to the presence of particulates in the water are reduced. In addition, the calculated digital image offers a graphic representation of the image either in combination with the visual image or as a sole product of the imaging apparatus 10. It will be understood that a total visual image is also possible without digitization. Thus, when an illumination beam is fanned out across the vehicle path and viewed with a camera, the above equation can be developed in 3-dimensions for each point where the fan beam hits a solid object.

The 3-D image of the object is calculated as the distribution of the progression in the values of R as each sequential line is recorded and assessed according to the equation above and the removal or subtraction of the height of the background, such as the actual sea floor. Because the emitted light from the illumination source 12 can be adjusted to be a fine thin line for calculation purposes, the resultant image obtained can actually be a compilation of a large plurality of sequential lines calculated back to the R value with adjustments made for variation in intensity, these being a function of both the R value and a compensated value obtained algorithmetically. Due to the fact that light within the water milieu is subject to varying amounts of scattering, the algorithmic adjustment is necessary to compensate for these scattering effects in the aqueous environment.

Figure 3:
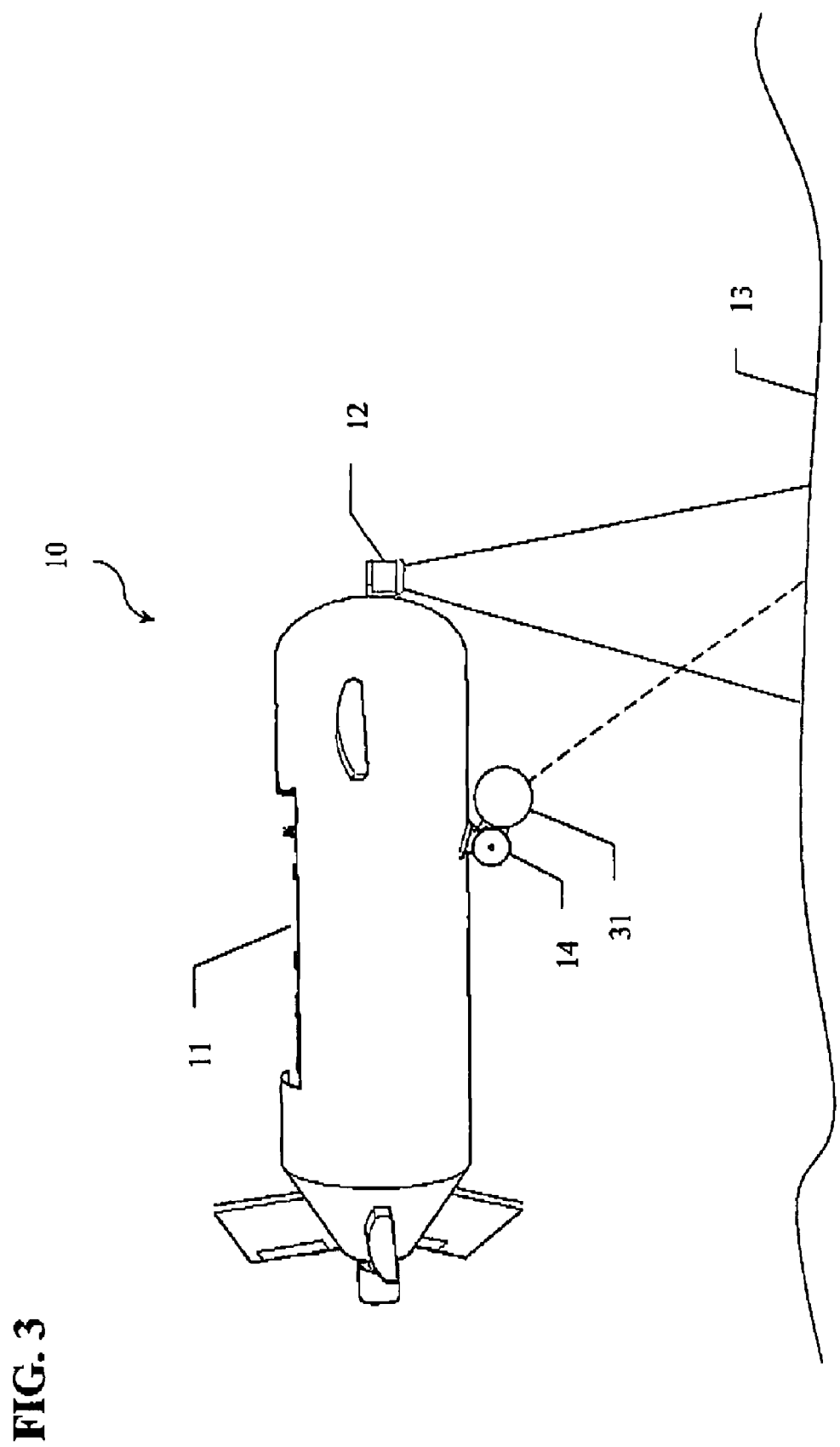
FIG. 3 shows another embodiment of the instant invention having a filter means for fluorescent detection.

An additional adjustment can also be made to incorporate navigational and/or vehicle speed data into the final positional equation so that a more accurate location is assigned to the object. This can be achieved by incorporation of navigational sensors or sensor systems which are attuned to respond to GSP, compass, gyro navigational systems, or others such systems as known to those of ordinary skill in the art. In addition, compensation for the pitching and rolling of the platform can also be taken into account so that the accuracy of the depiction of the image obtained is increased. By use of compensation, a more exact location is achieved with respect to a fixed object as well as the ability to locate objects on a moving surface also being possible. This could enable scanning of ship hulls for foreign objects relative to fixed positions along their extent while they are underway or drifting. In a further embodiment of the instant invention, as depicted in FIG. 3, a fluorescent analysis system or other alternative systems can be used either solely or in combination with the primary system. In this embodiment the camera or other detection means is replaced with a fluorescent detection means. This enables analysis of organic material present on the surface of the object. This particular knowledge is useful when a determination is necessary to ascertain the amount of time a particular surface has been in the aqueous environment with respect to other surfaces in the environment. For example, if an object has been recently added to a ship's hull, the amount of organic material present in that portion of the hull will be less than on the surrounding surfaces, and if that object is not otherwise accounted for by recent repair activities, then its presence may be of a suspicious nature. This type of knowledge is very helpful when it is desired that ships entering a possible port be free of possible terrorist-connected problems or when a ship may have been in some other way compromised in its integrity.

In order to effect the fluorescent embodiment of the instant invention, it is desired that the illumination source 12 illuminate at the desired wavelength. As known to those of ordinary skill in the art, for example, the use of a green light illumination at 532 nm is absorbed by organic material and fluoresced at 685 nm in the red range. Thus, if a scanning system is used where a combination of green and red detectors are reading the backscattered light, a change in the concentration of the organic material changes the ratio of the green/red returned signals. In this application, as the surface is scanned, if a new object has been recently added, then the amount of red given off by that object goes to zero and the ratio instantly signals that a surface change is present.

The illumination means itself may be tuned to a specific wavelength or wavelengths, or an appropriate filtering means may be used in concert with the source to tune the emitted light. This is also true of the detection or sensor means which may also have attenuating means connected with it to aid in selection of the desired wavelength. Of course, to maximize sensitivity with less costly illumination sources and detectors, it is preferable to use filtering means at both the source and detection portions of the analytical equipment. This choice as well as the choice of the specific source, detector, and filtering means are well within the scope of ordinary skill in the art.

It is further contemplated that the illumination source may also be a pulsed, strobe, or other "time-gating" source as known to one of ordinary skill in the art. This time-gating enables synchronization of the source with the detection means so that effects of outside interference are minimized. By collecting light only during the appropriate positive pulses of the time-gates, appropriate speed of light in water, and appropriate distance to the surface of interest, the effects of ambient light on the system are reduced. Motion blur effects can also be reduced in a time-gated system.

It is also contemplated that a simpler version of the fluorescence system may be used without the dual ratio calculating capacity. Thus a green-green system, a red-red system, a green-red system, a red-green system, or even multi-source illumination in the blue and green regions are possible with a red receiver/sensor. This would allow discrimination of the type of organism involved in bio-fouling which results in fluorescence. In addition a broad wavelength system may also be used for material analysis of the surface, excluding the presence of organic material and instead directed to the presence of foreign materials on the surface of the scanning target. It is further contemplated that any analytical system based on reflected light known to one of ordinary skill in the art may be incorporated into the instant system. These may be used for metals, plastics, fibrous materials, or other light detectable materials as desired by one of ordinary skill in the art.

In addition to the single illumination source and single camera system of FIGS. 1-3, a plurality of sources, cameras and/or detectors and, indeed, the combination of both a plurality of detection means and sources is also contemplated by the instant invention. The addition of a plurality of analysis systems in a multiple sensing system allows for the simultaneous assessment of a variety of surfaces or for the performance of multiple types of analysis at one time. This is particularly helpful when it is desired to scan the entire surface of an object without changing the direction of movement of the platform.

Figure 4:
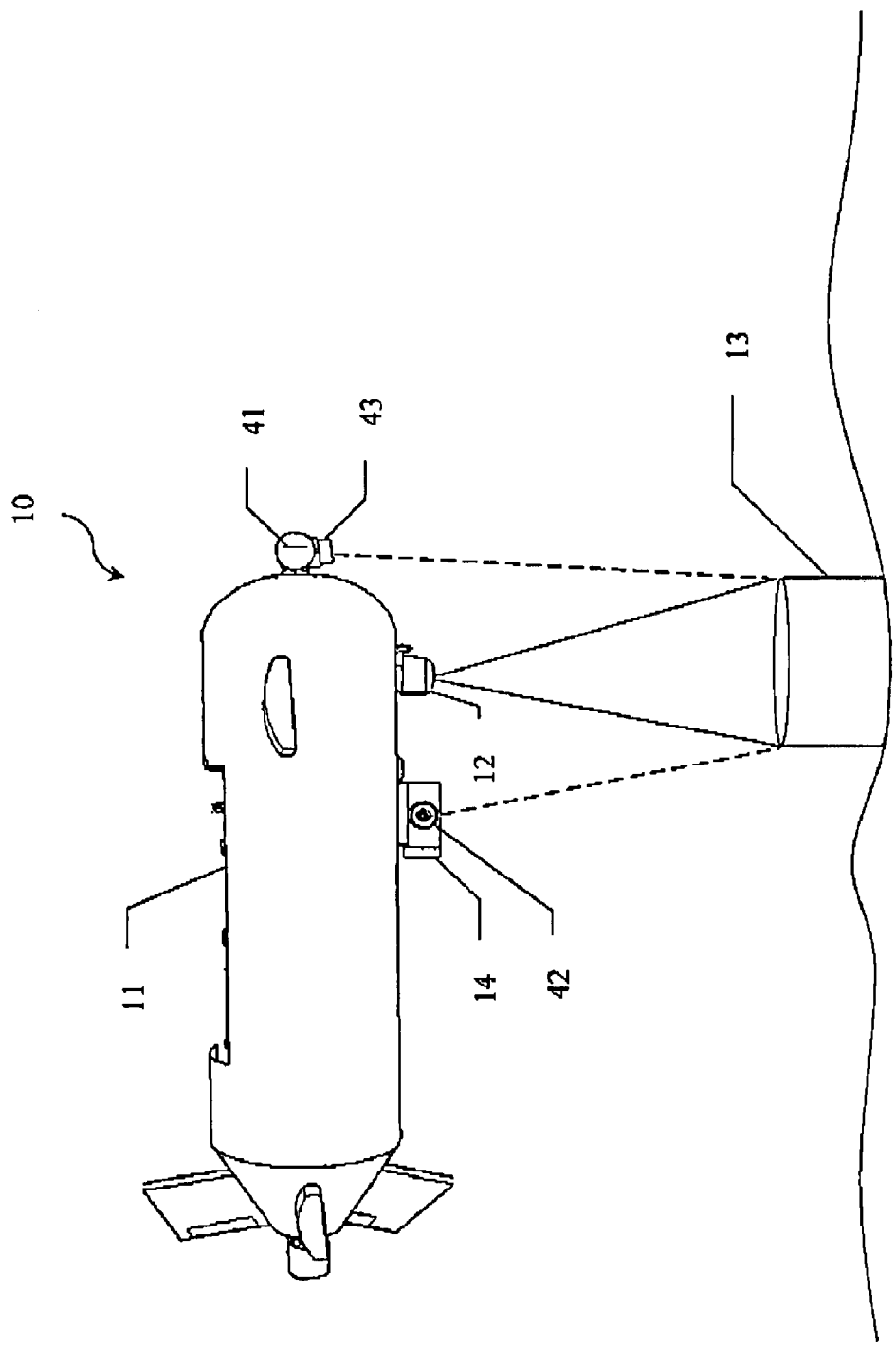
FIG. 4 shows a further embodiment of the instant invention with two cameras for simultaneous viewing of a plurality of sides of the subject object.

An embodiment of a multiple sensing system is shown in FIG. 4. Here, a single illumination source 12 supplies the light incident on object 13 which is reflected back to the two cameras 14 and 41 through lenses 42 and 43. It is also contemplated that a dual source, single detection system may also be used. By use of this geometry, it is possible to examine a plurality of surfaces with the platform moving only once over the object's location. This is particularly useful when the object or desired feature for study is then calculated back to a specific position or position on a an object. Thus the need for a multiplicity of passes over the object is obviated and the inherent problems of having to compensate for the new directional parameters are not present. This affords the user a simpler method of not only performing the scan, but also allows for analyses to be made under a wider variety of conditions such as rough water or on free-floating ship's surfaces. Because a single set of operating parameters is presented for calculation purposes, the resultant system is easier to handle and the data thus obtained are more reliable. In addition, by use of a single scan over a multiple direction scan, the optimum single direction whether it is chosen due to water conditions or because of its relation to another feature or surface, may be examined without having to gather performance data multiple times with respect to direction.

Figure 5:
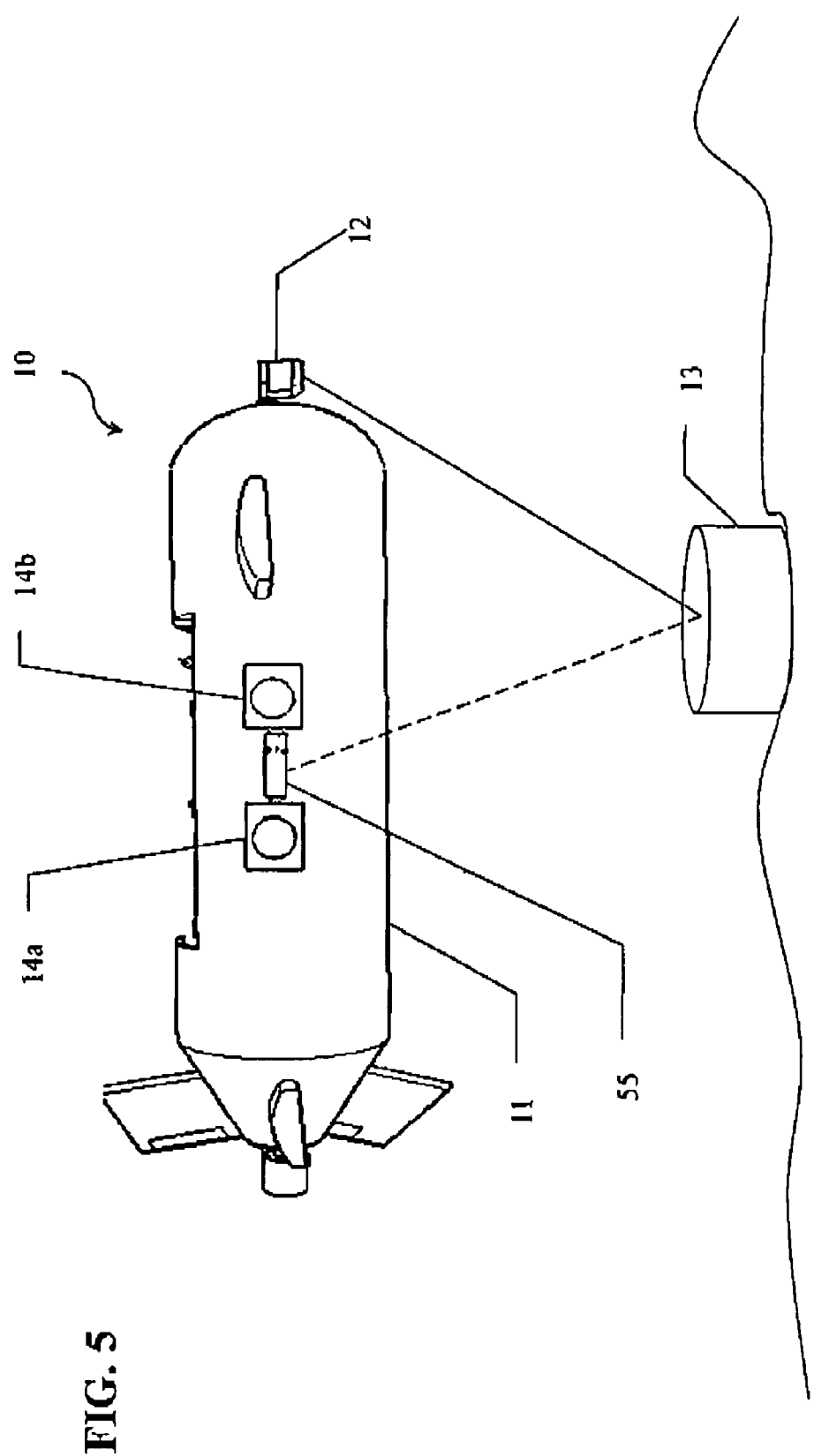
FIG. 5 shows a further embodiment of the invention including a beam splitting device for channeling the reflected light into multiple detector systems.

In the embodiment depicted in FIG. 5, an additional beam-splitting device 55 is inserted into the system. This device serves to physically divide the reflected signal into a plurality of equal components which are then conveyed into separate detectors such as 14a and 14b. This device may be a mirror type of device or any other reflective type of device available to one of ordinary skill in the art, such as an optical switch. This embodiment shows two detectors, but it is considered within the scope of the invention that any number of detection means may be chosen as desired by the particular application. If desired, each detector may be tuned to a different frequency or wavelength for simultaneous, multispectral imaging. In this fashion, 3-D and fluorescent imaging can occur simultaneously.

In addition, the location or locations of the cameras or detection means and the illumination source or sources may be moved to any desired location along the extent of the platform. This enables the artisan to stabilize the analysis system with respect to the movement of the platform and serves to reduce the effects of motion on the camera and illumination equipment. Also, by selectively locating the camera with respect to the body of the platform, the effects of pitch and yaw in rough conditions can be minimized by using the platform body as a stabilizer.

It is also contemplated that a plurality of geometries for the actual target of the illumination source 12 may be used. Thus, the system 10 may be configured with respect to the platform for scanning not only under the platform as shown in FIG. 1, but also configurations for scanning above and sideways with respect to the longitudinal axis of the platform are contemplated. Indeed, when a plurality of illumination and detection/camera systems are used, a plurality of combination of configurations is possible. The ability to locate the proper scanning system or systems, and subsequent configuration, is considered within the scope of ordinary skill in the art and can be chosen for the desired application.

It is also contemplated that additional types of analysis systems may be added to the platform in order to vary the type of analyses made by the instant system. Some of these include, but are not limited to, sonar systems, fluorescence systems, and other sensor based systems which may be used to monitor a variety of additional parameters simultaneously as chosen by one of ordinary skill in the art. In addition, when it is desired, other spectroscopic systems may also be used, including those operating in the UV, IR, and visible ranges.

In order to effect the fluorescent or other spectroscopic embodiments of the instant invention, it may be desired that the illumination source 12 be tuned to give a desired wavelength. In addition, the detection system may also be tuned to screen out undesired backscattered light in order to optimize the readout of the system. Also, any combination of tuned and untuned detectors and sources are considered within the scope of the instant invention and are a matter of choice as desired for particular applications. The tuning means may be an optical filter system or other means as known to those of skill in the art. Indeed, if a laser source is used, the laser itself may be tuned or, in the interest of economy, a separate tuning means may be used in conjunction with the laser.

As known to those of ordinary skill in the art, as discussed before, the use of a green light illumination at 532 nm is reflected back at 685 nm in the red range due to the presence of organic material. Thus, if a scanning system is used where a combination of green and red detectors are reading the backscattered light, then a change in the concentration of the organic material changes the ratio of the green/red returned signals. In this way, as the surface is scanned, if a new object has been recently added, then the amount of red given off by that object goes to zero and the ratio instantly signals that a surface change is present. By use of appropriate optical filters and tuning means, the source and detectors may be optimized for a specific set of wavelengths.

Modification and variation can be made to the disclosed embodiments of the instant invention without departing from the scope of the invention as described. Those skilled in the art will appreciate that the applications of the present invention herein are varied, and that the invention is described in the preferred embodiment. Accordingly, additions and modifications can be made without departing from the principles of the invention. Particularly with respect to the claims it should be understood that changes may be made without departing from the essence of this invention. In this regard it is intended that such changes would still fall within the scope of the present invention. Therefore, this invention is not limited to the particular embodiments disclosed, but is intended to cover modifications within the spirit and scope of the present invention as defined in the appended claims.

What is claimed is:

1. A 3-D imaging system adapted for remote information acquisition comprising:
   a. a platform for supporting and conveying the imaging system;
   b. an illumination source affixed to the platform, said illumination source adapted to transmit light to an object being scanned;
   c. a light detector affixed to the platform, said light detector adapted to collect the light reflected back from the object being scanned; and
   d. a data processing system in communication with the light detector for compiling data obtained from the reflected light to produce an image therefrom by using algorithm (i):

i:

$$i.\ R = S \bullet \tan\left(\phi + \frac{row\ \#\bullet F.O.V.}{totalrows}\right),$$

where R is equal to a distance between the illumination source and the object being scanned, S is equal to a distance between the source and the detector, row# is equal to a current row where line is detected, totalrows is equal to a total number of vertical imaging elements, F.O.V. is equal to a field of view as seen by the light receiver in relation to the object being scanned, and phi is equal to a vertical angle between a plane of light created by the illumination source and the center of the field of view of the detector.

2. The 3-D imaging system of claim 1, wherein the platform is selected from the group consisting of AUVS and ROVs.

3. The 3-D imaging system of claim 1, wherein the data processing system is adapted to detect a change in wavelength of the light received from the object being scanned.

4. The 3-D imaging system of claim 1, wherein the illumination source is a laser.

5. The 3-D imaging system of claim 4, wherein the laser is in planar geometry.

6. The 3-D imaging system of claim 4, wherein the laser uses a wavelength of between 400 and 630 nm.

7. The 3-D imaging system of claim 4, wherein the laser uses a wavelength of between 450 and 600 nm.

8. The 3-D imaging system of claim 4, wherein the laser uses a wavelength of between 500 and 575 nm.

9. The 3-D imaging system of claim 1, wherein the object being scanned is selected from the group consisting of a sea floor, objects resting on the sea floor, tethered objects, ship's hulls, seawalls, and floating objects.

10. The 3-D imaging system of claim 1, further comprising a navigational sensor system.

11. The 3-D imaging system of claim 1, wherein the data processing system is attached to the platform.

12. The 3-D imaging system of claim 1, further comprising a video screen in a remote location in communication with the data processing system for displaying the image.

13. The 3-D imaging system of claim 1, further comprising a secondary data processing system for processing signals from light, fluorescent, or sonar sources.

14. The 3-D imaging system of claim 13, further comprising an optical switch to split light received from the detector before being received by the two data processing systems.

15. The 3-D imaging system of claim 13, further comprising a second detector affixed to the platform adapted to collect a signal reflected back from the object being scanned.

16. The 3-D imaging system of claim 15, further comprising a second source selected from the group consisting of light, fluorescence and sonar.

17. A 3-D imaging system adapted for remote information acquisition comprising;
    a. a platform for supporting and conveying the imaging system;
    b. an illumination source affixed to the platform which is adapted to transmit light having a planar geometry to an object being scanned;
    c. a light detector affixed to the platform which is adapted to collect light reflected from the object being scanned; and
    d. a data processing system in communication with the light detector for compiling data obtained from the reflected light to produce an image therefrom.

18. The 3-D imaging system of claim 17, wherein the platform is selected from the group consisting of AUVs and ROVs.

19. The 3-D imaging system of claim 17, wherein the data processing system detects distance between the platform and the object being scanned.

20. The 3-D imaging system of claim 17, wherein the data processing system detects a change in wavelength of the light received from the object being scanned.

21. The 3-D imaging system of claim 17, wherein the illumination source is a laser.

22. The 3-D imaging system of claim 21, wherein the laser uses a wavelength of between 400 and 630 nm.

23. The 3-D imaging system of claim 21, wherein the laser uses a wavelength of between 450 and 600 nm.

24. The 3-D imaging system of claim 21, wherein the laser uses a wavelength of between 500 and 575 nm.

25. The 3-D imaging system of claim 17, wherein the object being scanned is selected from the group consisting of a sea floor, objects resting on the sea floor, tethered objects, ship's hulls, seawalls, and floating objects.

26. The 3-D imaging system of claim 17, further comprising a navigational sensor system.

27. The 3-D imaging system of claim 17, wherein the data processing system is attached to the platform.

28. The 3-D imaging system of claim 17, further comprising a video screen in a remote location in communication with the data processing system for displaying the image.

29. The 3-D imaging system of claim 17, further comprising a secondary data processing system for processing signals from light, fluorescent, or sonar sources.

30. The 3-D imaging system of claim 29, further comprising an optical switch to split light received from the detector before being received by the two data processing systems.

31. The 3-D imaging system of claim 29, further comprising a second detector affixed to the platform adapted to collect a signal reflected back from the object being scanned.

32. The 3-D imaging system of claim 29, further comprising a second source selected from the group consisting of light, fluorescence and sonar.

33. A method of obtaining 3-D images from a remote location comprising:
    a. illuminating an object being scanned;
    b. detecting reflection off of the object being scanned; and
    c. processing data from reflection in algorithm i for the production of an image therefrom:
    i.

$$i.\ R = S \bullet \tan\left(\phi + \frac{row\ \#\bullet F.O.V.}{totalrows}\right),$$

where R is equal to a distance between an illumination source and the object being scanned, S is equal to a distance between the source and a detector, row# is equal to a current row where line is detected, totalrows is equal to a total number of vertical imaging elements, F.O.V. is equal to a field of view as seen by the light detector in relation to the object being scanned, and phi is equal to a vertical angle between a plane of light created by the illumination source and the center of the field of view of the detector.

34. The method of claim 33, further comprising producing an image on a remote video monitor from the processed data.

35. The method of claim 33, wherein at least steps a and b occur on a platform selected from the group consisting of AUVs and ROVs.

36. The method of claim 33, wherein the illumination source selected is a laser with planar geometry.

37. The method of claim 36, wherein the laser uses a wavelength of between 400 and 630 nm.

38. The method of claim 36, wherein the laser uses a wavelength of between 450 and 600 nm.

39. The method of claim 36, wherein the Laser uses a wavelength of between 500 and 575 nm.

40. The method of claim 33, wherein the illumination source projects visible light, JR. or UV emission.

41. The method of claim 33, wherein the data processing step occurs at a remote location from the illuminating and detecting steps.

42. The method of claim 33, wherein the object being scanned is selected from the group consisting of a sea floor, objects resting on the sea floor, tethered objects, ship's hulls, seawalls, and floating objects.

43. The method of claim 33, wherein detected reflection is processed by a plurality of data processing means.

44. The method of claim 33, wherein detected refection is processed by a plurality of data processing means receiving reflection from two illumination sources.

45. The method of claim 33, wherein data obtained from two different detectors is processed by a plurality of data processing means.

46. The method of claim 33, wherein detected reflection is processed by two data processing means after a single reflection is split by an optical switch.

* * * * *